July 13, 1965    H. S. SCHNOLL    3,194,051
GYRO MOTOR BEARING TESTING DEVICE AND METHOD
Filed Sept. 25, 1962    4 Sheets-Sheet 1

INVENTOR.
HOWARD S. SCHNOLL
BY Herbert L. Davis
ATTORNEY

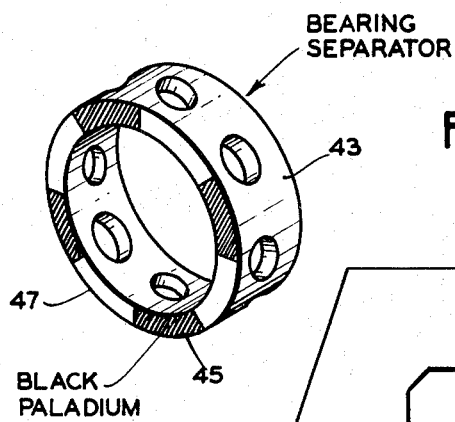
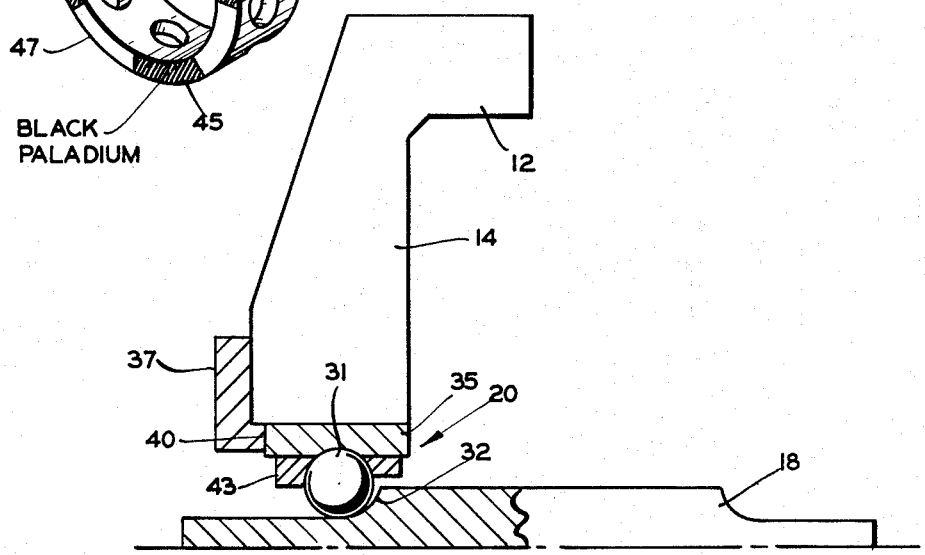
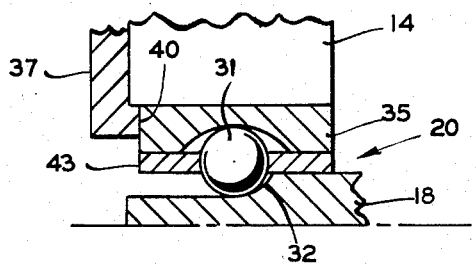

July 13, 1965     H. S. SCHNOLL     3,194,051
GYRO MOTOR BEARING TESTING DEVICE AND METHOD
Filed Sept. 25, 1962     4 Sheets-Sheet 3

INVENTOR.
HOWARD S. SCHNOLL
BY
*Herbert L. Davis*
ATTORNEY

United States Patent Office 3,194,051
Patented July 13, 1965

3,194,051
GYRO MOTOR BEARING TESTING DEVICE
AND METHOD
Howard S. Schnoll, Oakland, N.J., assignor to The Bendix Corporation, Teterboro, N.J., a corporation of Delaware
Filed Sept. 25, 1962, Ser. No. 226,188
4 Claims. (Cl. 73—9)

The invention relates to a gyro motor bearing testing device and method and more particularly to a device and method for accurately determining the setting of the true or correct dynamic (i.e.—running) preload of a gyro motor bearing under actual operating conditions.

An object of the invention is to provide a testing device and method for testing a gyro motor bearing under actual operating conditions so as to achieve the optimum value of the preload setting thereof from a manufactured gyro motor bearing set in a gyro motor and in which it is necessary to set the axial thrust with extreme care. Such a preload testing method will yield the following conditions for gyro reliability and reduction of waste in the construction of such bearings:

(A) Optimum life of the bearing contacting surfaces.

(B) Optimum stiffness of the bearing resulting in reduction of the ever-present random excursions of the spin axis due to mass unbalances, i.e., inadequate preload results in mass rotor movements when ball tract migration results due to improper preload. Mass unbalance about the spin axis causes drift in degrees per hour.

(C) Affords dynamic measurement of actual contact angle which determines the amount of isoelasticity in a gyro under environmental inertia forces — i.e., if an isoelastic system prevails the gyro drift due to the unequal compliance of the operating bearing contact angle results in drift in degrees per hour per $g^2$.

Another object of the invention is to provide a novel method for testing gyro bearings so as to determine the dynamic contact angle of the bearing balls thereof.

Another object of the invention is to provide a novel means and method of determining the slip of the bearings of a gyro assembly and conditions of excessive bearing preload.

Heretofore, the output of stabilized run-in bearings of gyro rotor applications has yielded far below a conservative figure of forty per cent (40%), which together with the accumulated man hours necessary to affect such bearings has resulted in the high price of the gyro instruments on the market today. Accordingly, a reduction in bearing failures by the more accurate testing preload setting thereof will inevitably lower the cost of such bearings to critical bearing customers i.e. gyro motors for government and civilian agencies for applications that necessitate inertial or attitude references. In the methods heretofore utilized in the testing of such bearings, the preload measure has been accomplished under statice and semistatic conditions where the torque applied to the bearing has in the main been merely a function of preload.

When the preload applied to a gyro motor bearing is set and tests are conducted under such static conditions, the true running preload is disguised. Further, upon measuring the speed of a bearing separator driven at a constant normal operating speed, it has been found that different increasing increments of axial preload will tend to cause the bearing separator speed to change so that there is effected a slower speed of the bearing separator with increase in the axial preload.

Thus, a rolling of the bearing balls in the bearing separator or cage results in a particular differential speed relative to the flywheel of the gyroscope rotor which is optimum; and any increase in preload results in a spin component to the bearing balls promoting sliding and a reduction of the true rolling component. Sliding leads to bearing failure so the spin component must be eliminated.

In view of the foregoing, an object of the invention is to provide a novel means and method for sensing the differential speed of rotation of the bearing separator under actual running conditions, since it has been found that the contact angle of the roller bearings at slower speeds may differ appreciably from that at actual operating speeds, and therefore, contact angles of the bearing balls should be checked dynamically under actual operating speeds.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 3 is an enlarged perspective view of the bearing separator and showing an end surface thereof having suitable coatings for periodically reflecting light rays with rotation thereof for operating a counting mechanism.

FIGURE 4 is a fragmentary sectional view illustrating the relationship of the outer race, inner race and bearing separator, in the gyro rotor assembly.

FIGURE 5 is an enlarged fragmentary sectional view illustrating the relationship of the bearing of FIGURE 4 to the outer race, inner race, and bearing separator and the difference in the angular contacting relationship of the roller bearing to the inner race with changes in the preload applied thereto.

Figure 1:
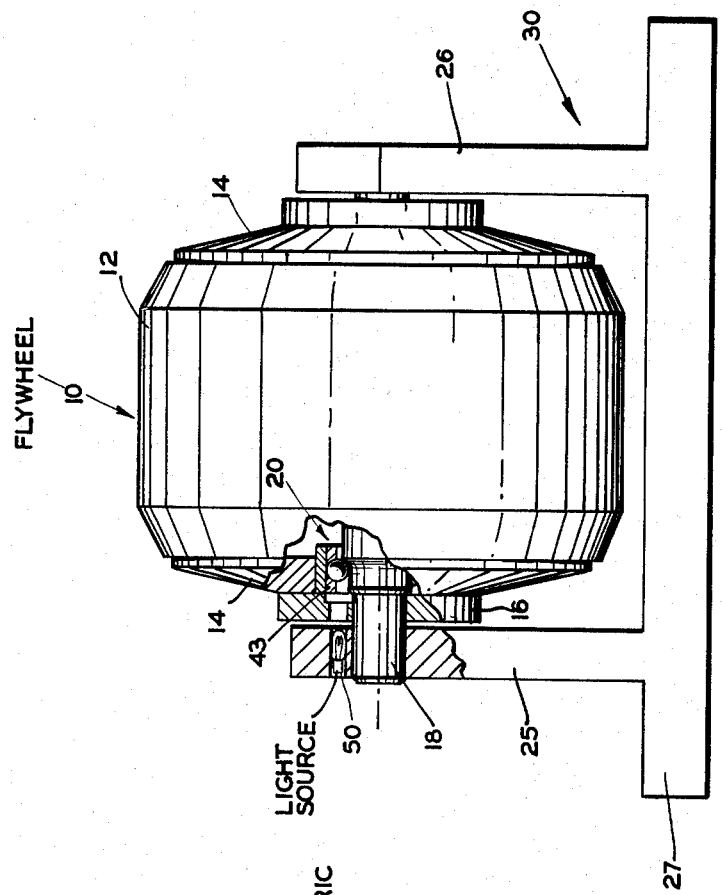
FIGURE 1 is a fragmentary sectional view of a test apparatus for the roller bearings of a motor of a gyroscope.

Referring to the drawing of FIGURE 1, there is indicated by the numeral 10 a gyro rotor of conventional type including a flywheel indicated by the numeral 12 and end bells 14 together with a preload retainer 16 and shaft 18 on which the end bells 14 are rotatably mounted by roller bearings indicated generally by numeral 20. Within the rotor 10 are suitable electric motor means, not shown, mounted on the shaft for driving the flywheel 12 in the conventional manner.

The shaft 18 is fixedly mounted between bracket members 25 and 26 which project from a base portion 27 of a test fixture indicated generally by the numeral 30.

As shown in greater detail in FIGURE 4, the bearing balls 31 of the roller bearings 20 are rotatably mounted on a ramp portion 32 of the inner race of shaft 18 while the bearing balls 31 also rotatably bear on outer race 35 of the roller bearing assembly 20. The outer race 35 is carried by the end bell portion 14 of the gyro rotor 10 and there is provided a preload retainer 16 which is suitably fastened to the end bell 14 and bears at 40 on the outer end of the inner race 35 so as to bias the outer race 35 inwardly and the bearing balls 31 towards the ramp portion 32 of the inner race 18.

A bearing separator or cage 43 is positioned between the outer race 35 and the inner race 18. The bearing separator 43 is driven at a differential speed relative to the outer race 35 driven by the end bell 14 and the inner race or shaft 18 which is retained in fixed relation thereto by the bracket members 25 and 26 in which the shaft 18 is fixedly mounted.

Figure 2:
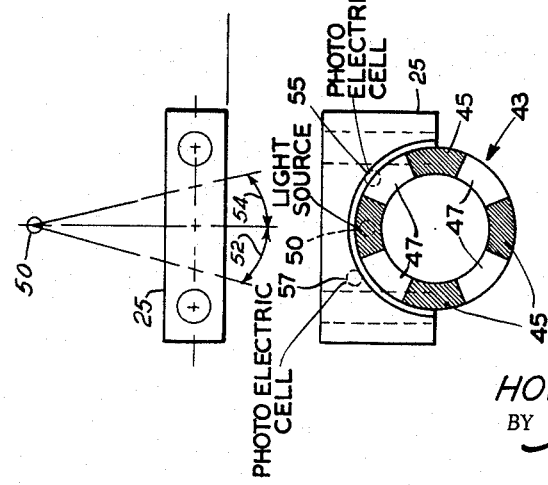
FIGURE 2 is an enlarged fragmentary end view of the bearing separator of FIGURE 1 with the light source and photoelectric cells shown in dotted lines so as to illustrate the operative relation thereof to the bearing separator.

As shown in FIGURES 2 and 3, the bearing separator 43 has an outer edge which is suitably coated in spaced relation with a black palladium paint 45 and a white paint 47 or other suitable means of separating between black and white for the reflection of light at periodic intervals so that the rotation thereof may be suitably indicated.

Figure 6:
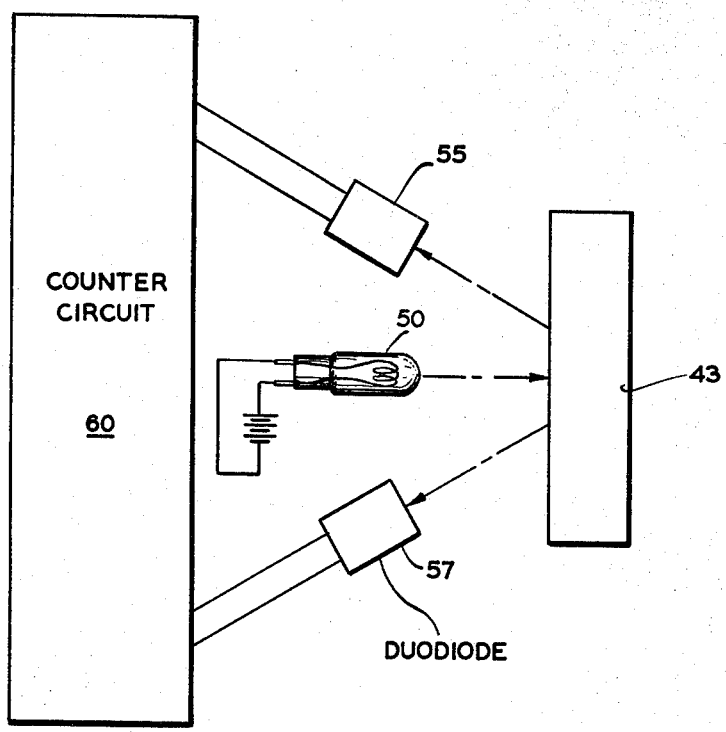
FIGURE 6 is a schematic view illustrating the relationship between the source of light and the photoelectric cells with respect to the surface of the bearing separator.

As shown in FIGURE 6 as well as in FIGURE 2, this latter action is effected by the provision of a source of light 50 carried by the bracket 25 and arranged to project a suitable ray of light at angles 52 and 54, on to the thus coated end surfaces 45 and 47 of the bearing separator 43, which rays of light may in turn be periodically reflected by the white surface thereof so as to actuate suitable photocells 55 and 57 or dual diodes also mounted in the bracket 25, as best shown in FIGURES 2 and 6 and operably connected into a conventional counter circuit, indicated in FIGURE 6 by the numeral 60.

The counter circuit is arranged so as to count the number of revolutions of the bearing separator 43 which in turn will indicate a differential speed thereof in relation to the known driven speed of the rotor element 10 so that under actual operating conditions as, for example, 24,000 r.p.m. under the existing preload conditions set by the preload retainer 16.

Figure 7:
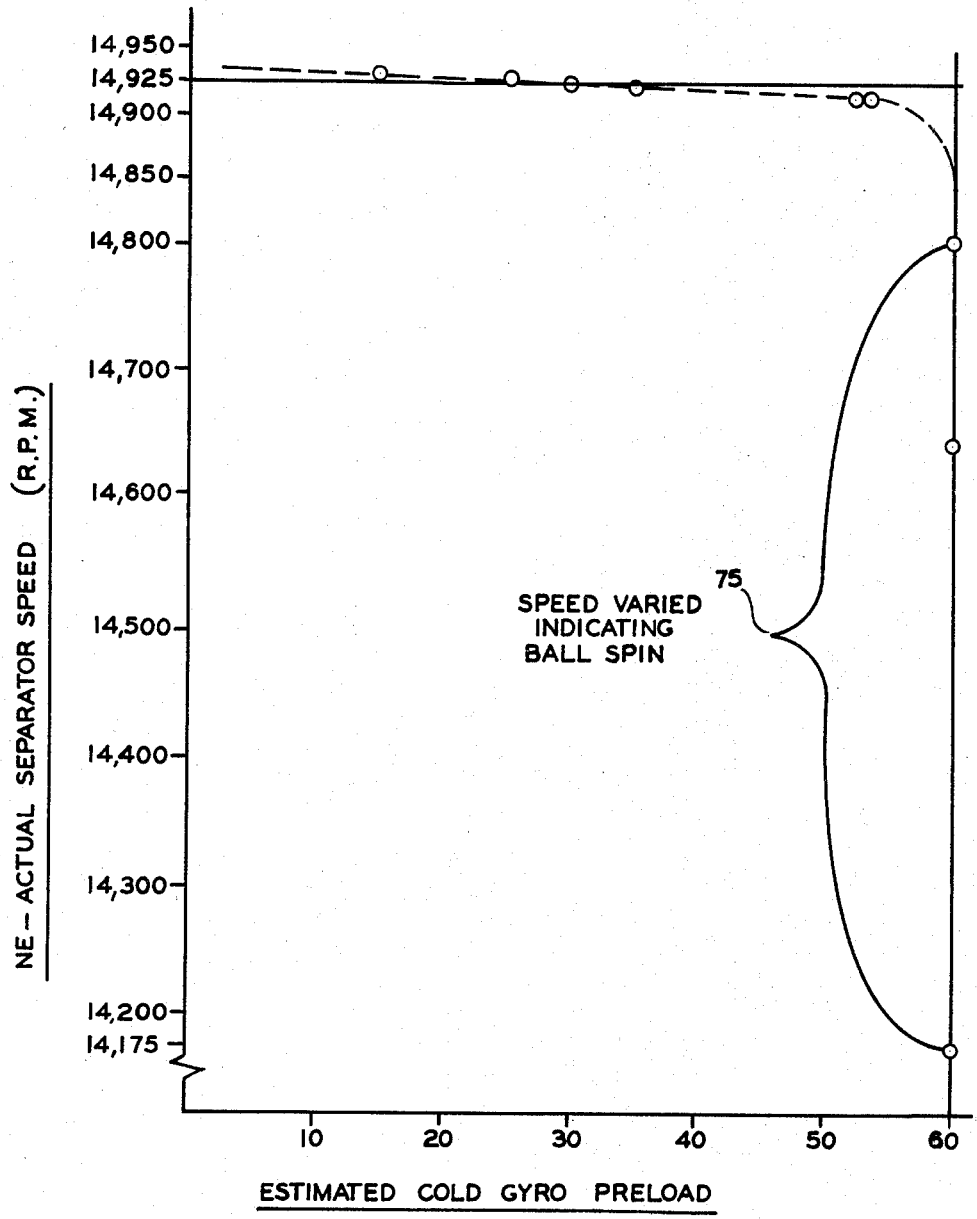
FIGURE 7 is a graphical illustration showing the relationship between the differential separator speed (r.p.m.) at varying preload conditions with the gyro rotor being driven at its normal operating speed of, for example, 24,000 r.p.m.

Under the aforenoted method, it will be seen that, as shown graphically in FIGURE 7, the measuring of the speed of the bearing separator 43 for different increasing increments of coaxial preload provided by the preload retainer 16, it will yield a relatively constant differential separator speed up to a point where excessive preload is obtained, at which point the angular contacting relation of the bearing ball 31 with the ramp 32 results in the rolling of the bearing ball without imparting differential speed to the bearing separator 43, as indicated graphically in FIGURE 7 by the bracketed line 75.

Thus an increase in the preload over the maximum permissible value will result in a spin component to the bearing ball 31 promoting sliding and a reduction of the true rolling component. Sliding leads to bearing failure so the spin component must be eliminated.

Due to manufacturing and measurement techniques today, it is impractical to calculate this speed through the basic formula relating to the parameters of the geometry of a bearing set:

*Example (Inner rotation will be considered)*

$$\cos \varphi = \frac{E}{d}\left(\frac{2N_e - 1}{N_o}\right)$$

where, $\cos \varphi$ = contact angle
$E$ = pitch diameter of balls in separator
$d$ = ball diameter
$N_e$ = separator r.p.m.
$N_o$ = flywheel r.p.m.

This new method also affords dynamic measurement of actual contact angle which determines the amount of isoelasticity in a gyro under environmental inertia forces—i.e., if an isoelastic system prevails, the gyro drift due to the unequal compliance of the operating bearing contact angle results in drift in degrees per hour per $g^2$.

Due to the various expansion and variations of dimensions, the contact angle $\cos \varphi$ at slow speeds differs appreciably from that at actual operating speeds. Therefore, measurement of true contact angle is disguised at slower speeds. Contact angles should be checked dynamically as well as adequate setting of bearing preload.

The foregoing provides a novel means and method for accurately checking a preload on a gyro motor bearing set to yield optimum life of the rolling surfaces and optimum stiffness. This is accomplished by setting an optimum rolling condition as indicated by the speed (r.p.m.) of the separator 43.

The reason for a lower speed of the separator 43 (as the applied preload is increased) resulted in a shift of the nominal curve in the region of constant speed (10 to 54 cold preload) to the bracketed line 75 in the region of abrupt reduction of speed (60 cold preload), as shown graphically in FIGURE 7.

When operating at synchronous speeds, the bearing balls 31 establish their own pitch diameter. However, at different preloads, as applied by the preload retainer 16, the shaft 18 and the outer race 35 deflect due to the various ball and track conformities (for example, 52% for the shaft 18 and 57% for the outer race 35).

The method herein presented readily lends itself to the reduction in the number of bearing failures that otherwise might result and may be substantially lessened if the preload is set with extreme care.

Moreover, since there is the increased cost of bearing sets, it has substantially resulted in the higher price of gyro instruments. It will be readily seen that the cutting down of bearing failures will inevitably result in a lower cost to critical bearing customers. Therefore, this new method lends itself to use in checking the true preload rolling speed of the bearing and reduction in the cost of the bearing.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A method of testing bearing assemblies of a type including a plurality of anti-friction bearings, an outer race and an inner race for carrying the anti-friction bearings, and a bearing separator positioned intermediate the outer race and the inner race; the steps comprising applying a preload to the outer race, rotating the outer race relative to the inner race under said preload at a constant speed, and counting the number of revolutions of the bearing separator so as to determine the differential speed thereof in relation to the constant driven speed of the outer race.

2. A method of testing anti-friction bearings of a motor to determine the maximum axial preload thereof under normal operating conditions, said antifriction bearings being of a type including an outer race and an inner race and a bearing separator intermediate the inner race and the outer race; the steps comprising applying a variable axial preload to the outer race, driving the outer race at a predetermined constant speed in relation to the inner race and under which condition the bearing separator is driven at a differential speed relative to the outer race, counting the number of revolutions of the bearing separator so as to determine the differential speed thereof in relation to the predetermined driven speed of the outer race, varying the preload applied axially to the outer race in different increasing increments whereupon a substantially constant differential bearing separator speed is maintained up to a point where an excessive preload is obtained.

3. A testing device for motor bearings including a shaft forming an inner race having a ramp portion, an outer race mounted in the motor, a plurality of bearings rotatably mounted in the outer race and on the ramp portion of the inner race, and a bearing separator positioned between the outer race and the inner race, the bearing separator having an outer edge coated alternately with a light reflecting material and a light absorbing material, the device comprising a pair of brackets for supporting opposite ends of the shaft, a source of light mounted in one of the brackets and including means for projecting light rays therefrom onto said outer edge of the bearing separator, photoelectric cell means carried by the said one bracket and periodically actuated by reflected rays of light from the coating of light reflecting material at the outer edge of said bearing separator, and means controlled by said photoelectric cell means and actuated by said reflected light rays and for counting the number of revolutions of the bearing separator for indicating the differential speed of the bearing separator in relation to the driven speed of the outer bearing race of the motor.

4. The combination defined by claim 3 including means for applying an axial preload to the outer race in increasing increments so that a relatively constant differential bearing separator speed may be maintained up to a point at which an excessive preload may be obtained and at which point the annular contacting relation of the bearings with the ramp of the inner bearing race results in the rolling of the bearings effecting a substantial decrease in the differential speed of the bearing separator.

References Cited by the Examiner
UNITED STATES PATENTS

| | | | |
|---|---|---|---|
| 2,045,555 | 6/36 | Almen | 73—10 |
| 2,485,888 | 10/49 | Jordan | 250—230 X |
| 3,041,867 | 7/62 | Knudsen | 73—9 |

RICHARD C. QUEISSER, *Primary Examiner.*

JOSEPH P. STRIZAK, *Examiner.*